United States Patent [19]
Hale

[11] 3,832,838
[45] Sept. 3, 1974

[54] COOPERATING WINDROWING STRUCTURE FOR A ROTARY TYPE RAKING DEVICE

[75] Inventor: John K. Hale, New Holland, Pa.

[73] Assignee: Sperry Rand Corporation, New Holland, Pa.

[22] Filed: May 1, 1972

[21] Appl. No.: 249,321

[30] Foreign Application Priority Data
June 2, 1971 Canada.............................. 114621

[52] U.S. Cl..................................... 56/377, 56/370
[51] Int. Cl............................................ A01d 79/00
[58] Field of Search .............. 56/192, 367, 370, 377

[56] References Cited
UNITED STATES PATENTS
3,546,868 12/1970 Hauser-Lienhard .................. 56/377
3,664,105 5/1972 Stiefvater et al...................... 56/370

FOREIGN PATENTS OR APPLICATIONS
1,408,463 8/1964 France................................. 56/370

Primary Examiner—Antonio F. Guida
Attorney, Agent, or Firm—Frank A. Seemar; John R. Flanagan; Louis J. Virelli, Jr.

[57] ABSTRACT

A rotor type raking device comprised of a pair of laterally spaced rotatively mounted rotor assemblies having a plurality of tines circumferentially depending therefrom and adapted to engage crop material and sweep it inwardly to deposit such in a windrow generally between the rotor assemblies. To augment the windrow forming capability, a windrow forming structure is provided for cooperation with rotating tines and principally functions to strip the crop material from the tines as they begin to lift and deposit the crop material in the windrow. Also the cooperating windrow forming structure functions to generally contain and confine the crop material within a specified windrow width, the present disclosure discloses two species of structure for cooperating with the tines in the windrow formation. The first species comprises a pair of laterally spaced, generally rearwardly extending rods mounted inwardly on the rotor assemblies. The second species is likewise mounted but comprises a pair of laterally spaced generally rearwardly extending baffle structures.

7 Claims, 8 Drawing Figures

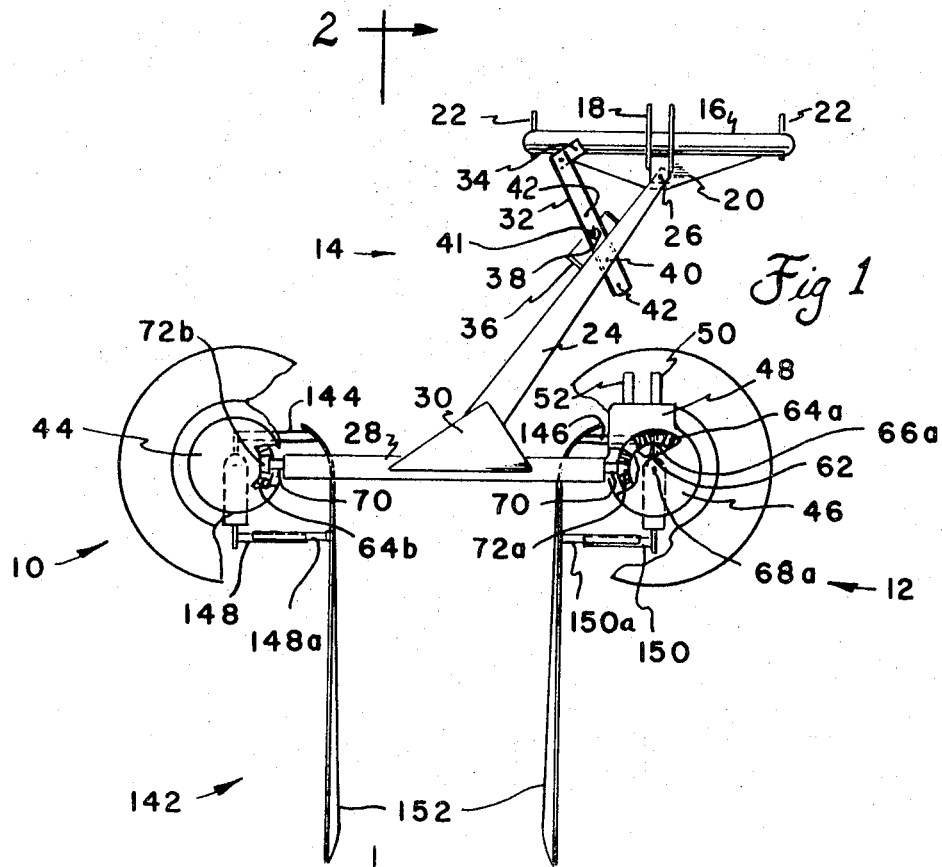
Fig 1
Fig 3
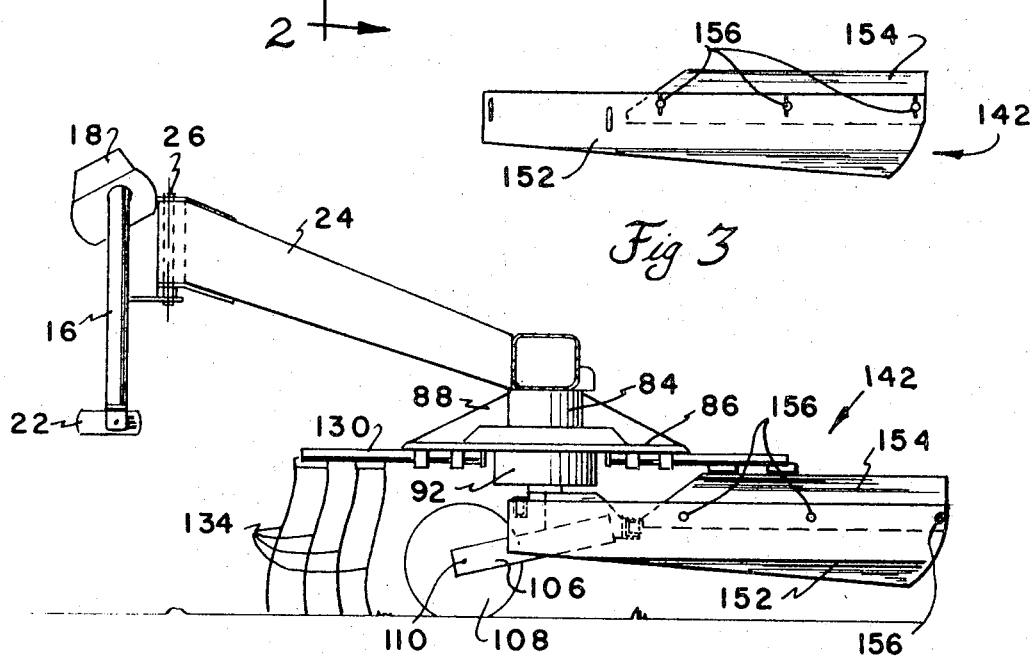
Fig 2

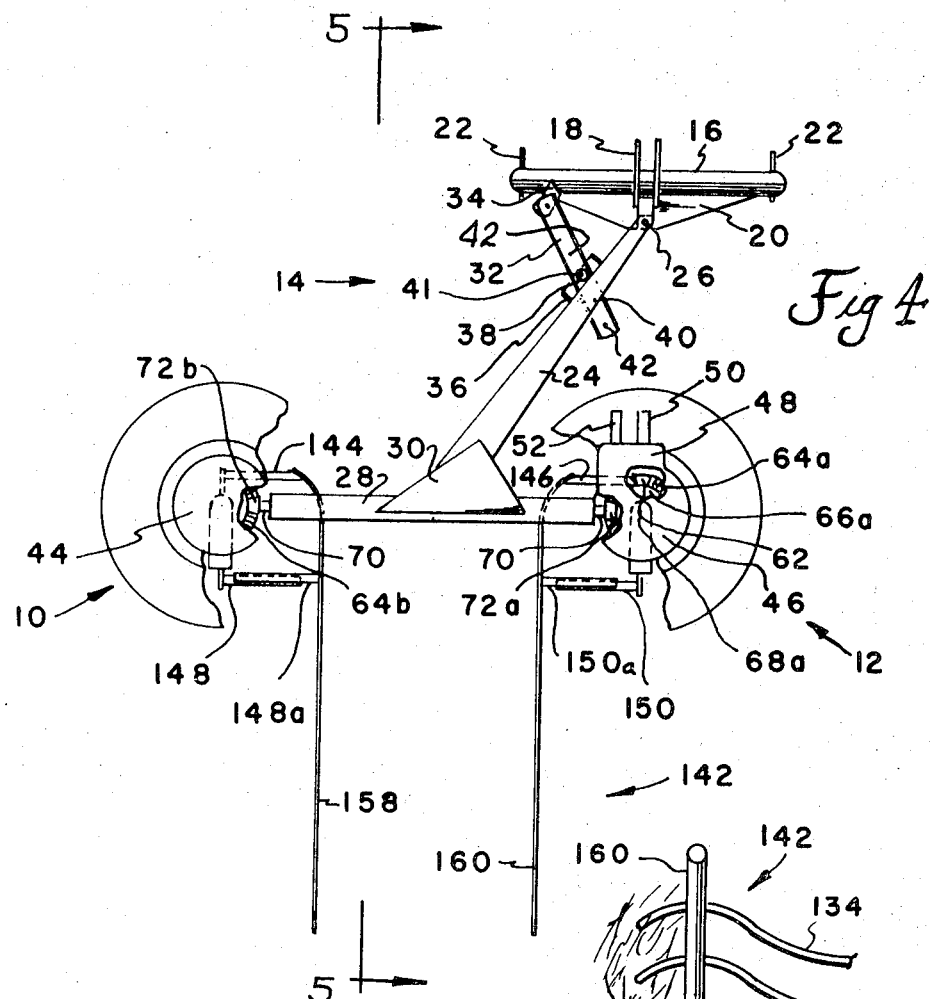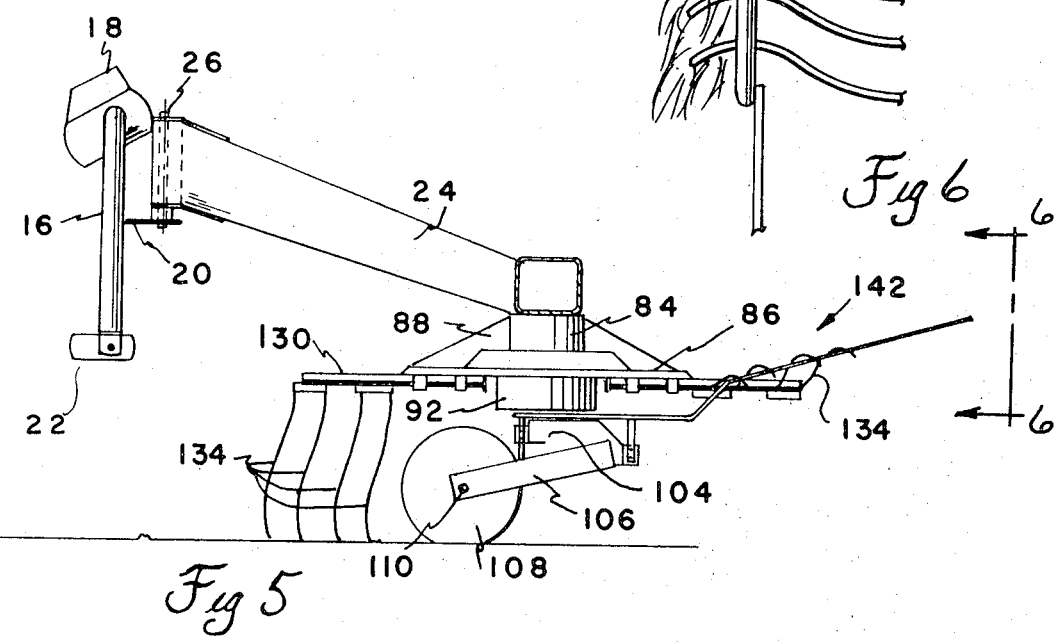

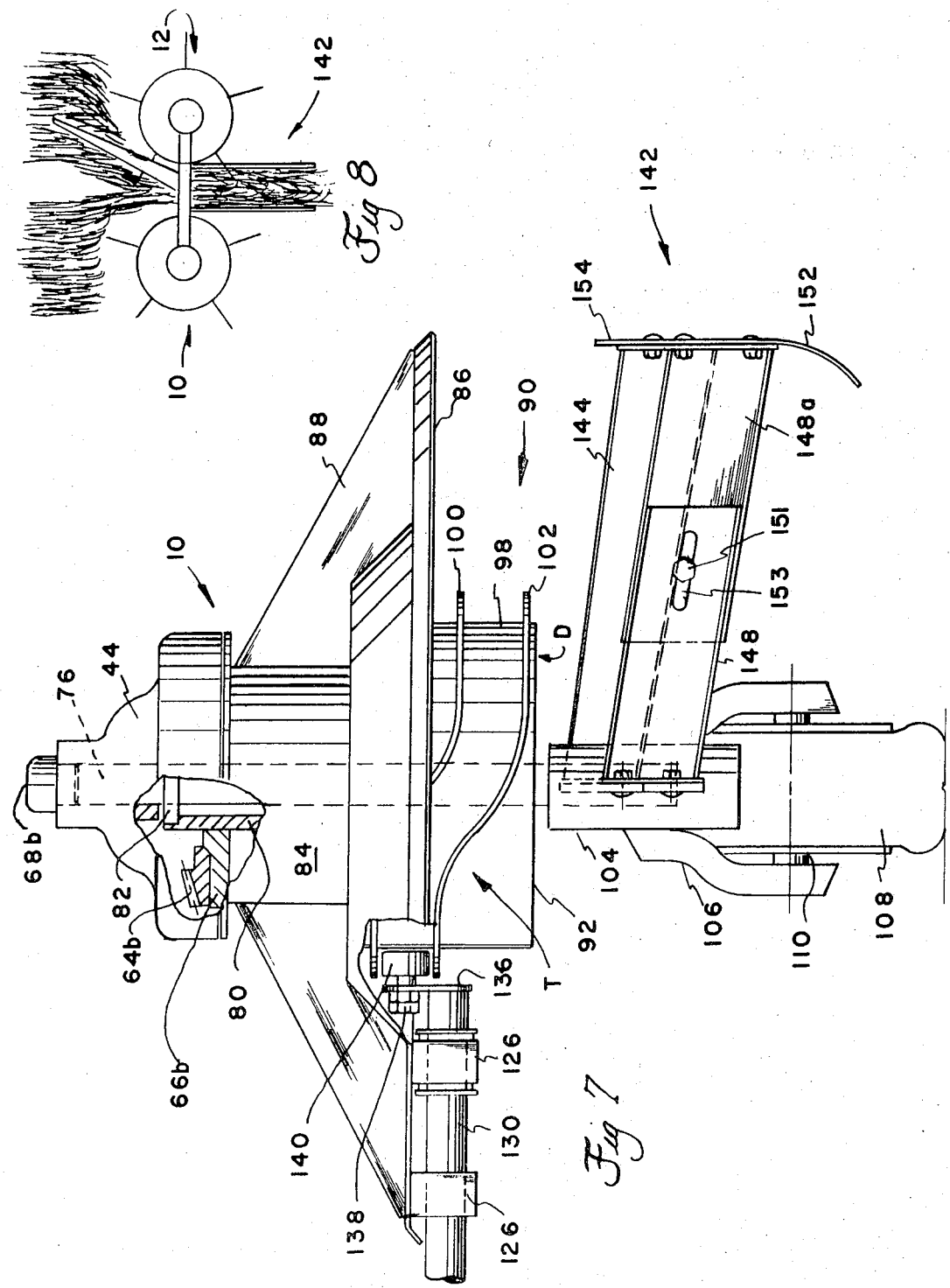

COOPERATING WINDROWING STRUCTURE FOR A ROTARY TYPE RAKING DEVICE

Cross Reference to Related Application

The present application relates to recently issued U.S. Pat. No. 3,664,105, issued May 23, 1972, entitled "Rake-Tedding Device" which is assigned to the Sperry Rand Corporation by the following inventors: Thomas L. Stiefvater, James G. Greiner, John K. Hale and Thomas W. Waldrop.

BACKGROUND OF THE INVENTION

The present invention relates to agricultural machinery and more particularly to a rotor type raking device having cooperating structural means for forming a windrow.

In forming crop material into windrows, the double rotor type raking devices have tine members adapted to engage crop material about the outboard sides of the rotors and sweep it around to the inboard sides where the crop material is deposited in a windrow. In some instances, the tines tend to carry some of the crop away from the windrow as they move around the rear of the rotors toward the outboard sides. Also in some situations, the tines top the windrow being formed, scattering the crop material to one side. These two occurrences have led to the development of devices, to be discussed subsequently, for cooperating with the rotors in containing and confining the crop material in a windrow.

Most rotor type raking devices are also adaptable for tedding by particularly adjusting the tines such that they engage the windrow and spread it about a width that approximates that of the raking device. In tedding it has been found that the rotor speed may be significantly higher than when raking. Therefore, some of the prior art rake-tedding devices have employed auxiliary means to assist in controlling the crop during windrowing such that the raking device may be driven at the same high speed for both raking and tedding. One such prior art device is shown in Netherlands Patent No. 6,610,785 to C. Van der Lely. The Van der Lely raking device includes an inverted U-shaped cage centrally disposed behind double rotors. During the windrowing operation crop material is engaged about the outboard sides of the rotors and swept forwardly therearound such that the crop material is propelled rearwardly into the cage. One of the most common problems associated with this cage type of windrow forming structure is that in very heavy crops, the crop material tends to bunch within the cage, thereby leaving no space for other crop material to enter. The excess crop material is then propelled outwardly from the windrow. One other type problem associated with the Van der Lely cage is that the front portion of the cage can only be spaced so close to the rear extremity of the tine path, thus some crop material is often carried from the area intermediately between the rotors to an area outside of the windrow forming area.

One other type of windrowing structure adapted for employment within rotor type raking devices is that shown in Netherlands Patent No. 6,910,757. This reference teaches the use of a single longitudinally extending screen spaced forwardly between the pair of rotors. This type of screen is used in conjunction with a pair of rotor assemblies in which the tines extend generally outwardly therefrom and not downwardly as in the present disclosure and the disclosure of Van der Lely referred to above. Also it may be noted, by placing the screen forwardly of the rotors, accumulations are likely to occur and such can detract from the total operating efficiency of the raking device.

SUMMARY OF THE INVENTION

Applicant has devised a windrow forming structure that is mounted intermediately between the rotor assemblies and generally functions to strip the hay from the tines and confine the crop in a neat and clean windrow. In particular, the windrow forming structure is of an open, laterally spaced construction that is mounted inwardly of each rotor assembly and extends rearwardly therefrom through the planar path of the tines. The structure is so disposed that the tines move up over intermediate portions of the structure as the tines move through the lift phase of the rotor cycle. The windrow forming structure of the present invention is provided in the form of two species. The first species is comprised of a pair of laterally spaced rods extending rearwardly through the planar tine path. The second species is likewise mounted with respect to the rotor assemblies and is comprised of a pair of laterally spaced baffle structures.

It is therefore the principle object of the present invention to provide a windrow forming structure for a rotor type raking device that is cooperative therewith in the formation of a windrow.

Another object of the present invention is to provide a windrowing structure that is particularly disposed intermediately between the rotors.

A further object of the present invention is to provide a rotor type raking device with a windrowing structure of a generally lateral space, open construction, the windrowing structure being particularly adapted to strip crop material from the tines of each rotor and to generally contain the crop in an appropriate windrow.

A further object of the present invention is to provide a windrowing structure that is laterally adjustable for forming different width windrows.

A more particular object of the present invention resides in the provision of a windrowing structure for employment within a rotor type raking device in the form of a first species comprised of a pair of laterally spaced rods mounted inwardly relative to said rotors and extending rearwardly therefrom through the path of the tines which depend downwardly from each rotor and engage crop material and sweep it inwardly for depositing such in a windrow.

Another particular object of the present invention resides in the provision of a second species comprised of a pair of laterally spaced baffle structures mounted inwardly relative to said rotors and extending rearwardly therefrom through the planar path of the tines.

A further object of the present invention resides in the provision of a windrowing structure disposed intermediately between the rotors such that the structure projects through the path of the tines depending circumferentially around each rotor, and the particular provision of a cam for actuating said tines from a ground engaging position to a raised elevated position, the cam being particularly shaped and so disposed such that the tines are actuated up over the windrow forming structure during the raking operation.

Description of the Drawings

FIG. 1 is a plan view of a double rotor raking device having the second species, windrowing baffles, mounted thereon.

FIG. 2 is a side elevational view of the double rotor raking device taken through the line 2—2 of FIG. 1.

FIG. 3 is a fragmentary side elevational view showing the detailed construction of the windrowing baffle structure.

FIG. 4 is a plan view of the double rotor raking device having mounted thereon the windrowing structure of the first species, a pair of laterally spaced rearwardly extending rods.

FIG. 5 is a side elevational view of the double rotor raking device taken through the line 5–5 of FIG. 4.

FIG. 6 is a view taken along the line 6—6 of FIG. 5 and particularly shows a rod stripping crop material from a tine assembly.

FIG. 7 is a side elevational view of a rotor assembly.

FIG. 8 is a schematic view illustrating the cooperative nature between the windrow forming structure and the rotor assemblies.

In the following description right-hand and left-hand reference is determined by standing at the rear of the raking device and facing the direction of travel.

DESCRIPTION OF THE PREFERRED EMBODIMENT

With reference to the drawings, particularly FIGS. 1 and 3, the raking device of the present invention is generally comprised of a pair of left and right-hand rotor assemblies indicated by numerals 10,12 respectively. The rotor assemblies 10,12 are wheel supported as shown in FIGS. 2 and 5 and are pulled through the field by a hitching frame structure, indicated generally by the numeral 14, which is adapted to connect about the front thereof to a conventional three point tractor hitch.

The front portion of the hitching frame structure comprises a generally U-shaped yoke 16 having a top hitching assembly 18 welded about a top intermediate portion thereof and adapted to connect to an upper center link, not shown, of the three point tractor attachment. Pivotally secured to the lower outside ends of the yoke 16 is a pair of floating links 22 which connect the yoke with lower outside links, not shown, of the the three point tractor attachment.

A support plate 20 extends between the downwardly extending arms of the yoke 16 and cooperates with the top hitching assembly 18 to receive a pivot pin 26 which connects the main beam 24 of the hitching frame with the yoke. Main beam 24 extends rearwardly where it joins a drive housing 28 intermediately the outside ends thereof. A reinforcing plate 30 is suitably fixed to both the main beam 24 and drive housing 28 to reinforce that connection.

To position and control the lateral movement of the present raking device a lateral positioning link 32 is mounted between the lefthand side of the yoke 16 and an intermediate point on beam 24. More particularly, the front end of lateral positioning link 32 is fixed to a bracket 34 which is mounted on the left side of the yoke 16. The rearmost end of the lateral positioning link 32 is provided with two spaced apart apertures, the forward most aperture, indicated by numeral 38, being provided for locking the main beam 24 such that the raking device is positioned in an offset relationship to a tractor pulling the frame. The rearmost aperture, indicated by numeral 40, is employed to lock the main beam 24 in a transport position such that the raking device is generally centered behind the tractor and frame 14. To lock the raking device in either the offset or transport position, a locking pin 41 is inserted through the aperture and on through a connecting plate 36 which extends laterally from the main beam 24. Also the lateral positioning link 32 is provided with a pair of spaced apart stops 42 disposed about the rearmost portion of the link. The stops 42 provide a third operating position for the raking device, this third operating position being termed a floating position as the main beam 24 is allowed to move back and forth between the stops.

Mounted on opposite ends of drive housing 28 and extending outwardly therefrom are left and right-hand gear housings indicated by numerals 44,46 respectively. Integrally formed within the right-hand gear housing 46 is a gearbox 48 which houses a pair of input drive shafts.

Rotatively mounted within the gearbox housing 48 are a pair of shafts, a high speed input shaft and a low speed input shaft indicated by numerals 50,52 respectively. Since windrowing normally requires a slower rotor speed than tedding, low speed input shaft 52 is connected to a PTO shaft, not shown, which is driven by a tractor when the raking device is used for windrowing. Conversely, in tedding operations, the PTO shaft is connected to the high speed input shaft 50.

The output motion of the gearbox 48 is transmitted to a ring gear 64a of the right-hand rotor assembly 12 by a pinion 62. The ring gear 64a is fixed to a carrier plate 66a that is rotatively mounted about vertical axis 68a of the right-hand rotor assembly. Ring gear 64a in turn drives pinion 72a which is fixed to the right-hand end of a transversely extending drive shaft 70. The motion transmitted to drive shaft 70 is further transmitted to ring gear 64b of the left-hand rotor assembly 10 by a pinion 72b. Ring gear 64b is mounted similarly to ring gear 64a as it is fixed to a carrier plate 66b which is rotatively mounted about vertical axis 68b of the left-hand rotor assembly.

Basically the left and right-hand side rotor assemblies 10,12 are of identical construction except for the fact that the right-hand gear housing 46 has the two speed gearbox 48 associated therewith. With particular attention now directed to FIG. 7, the left-hand rotor assembly 10 is shown therein. Gear housing 44 has fixed thereto a support shaft 76 which extends downwardly therefrom and generally coincides with the left-hand vertical axis 68b. Disposed below gear housing 44 is an inner hub 80 which is rotatable about support shaft 76 by bearing means 82. Carrier plate 66b and consequently ring gear 64b is fixed to the inner hub 80 and rotatable therewith as the ring gear is driven by pinion 72b. Also fixed to the inner hub 80 is a housing 84 which is disposed above a bottom plate 86 which extends radially from the support shaft 76. The housing 84 and bottom plate 86 are joined by a plurality of equally spaced radially extending gussets 88.

Rotatively disposed below the bottom plate 86 is a cam assembly indicated generally by the numeral 90. The cam assembly includes a rotatably adjustable cylindrical housing 92. Wound around the cylindrical housing 92 is a cam track 98 defined by an upper rail 100 and a lower rail 102. The cam profile includes a dwell segment D and a throw segment T, the throw segment consisting of the cam's rise and fall.

Key to the bottom of the support shaft 76 is a wheel housing 104. Fixed to the wheel housing 104 is a wheel arm 106 that extends generally downwardly therefrom and has a wheel 108 rotatably mounted about the lower end thereof about axle 110.

Each rotor assembly includes a plurality of equally spaced radially extending tine bars 130. Each tine bar 130 is rotatively mounted in a pair of radially spaced bearings 126 which are fixed to the lower bottom plate 86. A rocker arm 136 is fixed to the inward end of each tine bar 130 and is further pivotally connected to a follower 140 by a pivot pin assembly 138. The follower 140 is confined within rails 100,102 of the cam track 98. Thus as the follower 140 moves within the throw profile of the cam assembly 90, the individual tine bar 130 is rotated and the tines 134 depending from the outer end are lifted to a raised elevated position and then lowered to a crop engaging position.

In windrowing hay, the cam assembly 92 is adjusted such that the tines engage the crop material about the outboard sides of each rotor assembly and sweep the crop forwardly around the rotors to the inboard sides at which time the tines begin to elevate, depositing the crop in a windrow generally between the rotor assemblies 10,12. In forming windrows with a double rotor raking device it is quite common for the tines to carry the crop material from the windrow as they begin to elevate and move outwardly from the rotor assemblies. This is referred to as windrow topping and is particularly present in fluffy crops.

In view of this problem of windrow topping, applicant has devised a windrow forming structure, indicated generally by numeral 142, which is adapted to cooperate with the rotor assemblies 10,12, particularly the tines 134, in forming the windrow (FIG. 8). The windrow forming structure of the present invention is particularly disposed intermediately between the rotor assemblies and as particularly shown in the drawings generally extend through the planar path of the tines. In the windrowing operation, the cam is so adjusted that the tines begin their lift about the inboard sides of the rotor assemblies 10,12 and just before the tines arrive at the rearmost position of the rotor assemblies they are at their maximum altitude. The windrow forming structure of the present invention is disposed such that the rear portions thereof extend through that portion of the planar path of the tines where the tines have their maximum altitude. In this respect, the windrowing structure functions to strip any crop material that may be carried by the tines. Moreover, the windrow forming structure 142 aids in the containment of the crop material within the windrow.

The windrow forming structure 142 is mounted to each rotor assembly 10,12 by a pair of longitudinally spaced, inwardly extending arms. The left and right-hand front mounting arms are indicated by the numerals 144,146 respectively, while the left and right rear mounting arms are indicated by the numerals 148,150 respectively. It is further noted that the rear mounted arms include slidable extension members 148a,150a which are adjustable laterally for varying the width of the windrow forming structure. This lateral adjustment includes a bolt assembly 151 extending through opening 153, as best seen in FIG. 7.

Turning to FIGS. 1-3, a particular species of the windrowing structure of the present invention is shown therein. Particularly, this species is termed a baffle structure and comprises a pair of lower plates 152 fixed to the inward end of a pair of corresponding mounting arms and extending rearwardly therefrom through a rear portion of the planar tine path. It is seen that the front portion of the lower main plates 152 are arced to readily accommodate the crop being swept forwardly around the rotor assemblies 10,12. Adjustably mounted to the upper portion of each lower plate 152 is an upper plate 154, the connection being made by a series of bolt assemblies 156 which enable the upper plate to be adjusted vertically.

In the raking operation the cam assembly is adjusted such that the tines engage the crop material about the outboard sides of the rotor assemblies and sweep the crop forwardly therearound into the open space defined by the rearwardly extending baffle structures. As the tines leave the inboard side of each rotor assembly they begin to lift gradually and as they approach each baffle structure they begin to raise and move thereover. As the tines 134 lift over the upper plate 154, any crop that may be carried by the tines is stripped therefrom as the upper plate is adjusted such that its upper edge is in close proximity to the tine tips as they pass thereover. Also it is further appreciated that the pair of baffle structures shown in FIGS. 1-3 serve additionally to contain the crop in the space therebetween which ultimately results in a cleanly formed windrow. It is also noted that in the more massive crops the baffle structures may be adjusted laterally by sliding the extension members 148a,150a of the rear arms in a lateral direction.

FIGS. 4-6 show another species of the windrow forming structure. This species is termed a rod species as the basic structure comprises a pair of laterally spaced rods, each mounted to a respective pair of front and rear mounting arms that extend inwardly from each rotor assembly. Generally each rod, indicated by numerals 158,160, have a forward portion fixed to the above referred to arms and extend generally rearwardly therefrom in lateral spaced apart relationship through the planar path of the tines. And as in the case with the baffle structures, the rods function to strip any crop material that may be carried by the tines and generally function to contain the upper portion of the windrow about a width that corresponds to the space therebetween. In the particular embodiment shown, the rods 158,160 may be adjusted vertically by simply bending and shaping them and it is contemplated that they will be vertically disposed such that the tines just barely clear them during that portion of the tine cycle where the rods extend through the planar path of the tines.

The terms, "upper," "lower," "forward," "rearward" etc. have been used herein merely for the convenience of the foregoing specification and in the appended claims to describe the raking device and its parts as oriented in the drawings. It is to be understood, however, that these terms are in no way limiting to the invention since the raking device may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described my invention, what I claim is:

1. A cooperating windrow forming structure for a rotor type crop raking device, comprising in combination:

a pair of counter rotating rotor assemblies rotatively driven about a pair of laterally spaced vertical axis;

a plurality of longitudinally extending tines circumferentially depending from each rotor assembly and operative to move from a generally downwardly extending crop engaging position to a generally horizontally extending elevated position and back to said crop engaging position during a single revolution of a corresponding rotor assembly, said tines particularly adapted for raking to assume said ground engaging position generally about an outboard side of each rotor assembly and to rake the crop material therearound to an inboard side of each rotor assembly at which time said tines are adapted to begin to move to said horizontally extending elevated position, thereby depositing the crop material carried therewith in a windrow generally between said rotor assemblies, and then return to said crop engaging position at said outboard side of each rotor assembly; and a generally rearwardly extending windrow forming structure mounted inwardly relative to each of said rotor assemblies and particularly disposed to extend through that portion of the path of said tines where the tines are generally in said horizontally extending elevated position whereupon a substantial trailing portion the longitudinal extent of said tines progressively passes by said windrow structure in close proximity thereto such that said windrow structure effects stripping of remaining crop material from along said longitudinal extent of said tines and generally containing of said crop material within said windrow structure.

2. The raking device as set forth in claim 1 wherein said windrow forming structure comprises a pair of laterally spaced rods, each rod fixed inwardly relative to a corresponding rotor assembly and extending rearwardly therefrom.

3. The raking device as set forth in claim 1 wherein said windrow forming structure comprises a pair of laterally spaced baffle structures.

4. The raking device as set forth in claim 3 wherein each of said baffle structures includes upper and lower plates connected together, said plates adapted for vertical adjustment such that the height of each baffle structure may be varied.

5. The raking device as set forth in claim 3 wherein said baffle structures each includes an upper edge portion disposed to extend through said portion of the path of said tines where said tines are in said generally horizontally extending elevated position.

6. The raking device as set forth in claim 1 wherein said each rotor assembly includes:

one or more tine bars to which said tines are connected;

means for rotatably mounting said tine bars to extend radially from said vertical axis of said each rotor assembly; and operative means for rotating said bars to change said tines between said downwardly extending crop engaging position and said horizontally extending elevated position.

7. The raking device as set forth in claim 1 wherein each of said windrow forming structures includes an upper edge portion disposed to extend through said portion of the path of said tines where said tines are in said generally horizontally extending elevated position.

* * * * *